United States Patent Office 3,410,817
Patented Nov. 12, 1968

3,410,817
POLYURETHANE LATICES
James M. McClellan, Jr., Detroit, Seymour L. Axelrood, Trenton, and Oscar M. Grace, Madison Heights, Mich., assignors to Wyandotte Chemicals Corporation, Wyandotte, Mich., a corporation of Michigan
No Drawing. Filed Apr. 29, 1965, Ser. No. 452,003
19 Claims. (Cl. 260—29.2)

ABSTRACT OF THE DISCLOSURE

Polyurethane latices are obtained by the chain extension of an NCO-terminated prepolymer prepared from certain polyalkylene ether polyols having a functionality greater than two and a molecular weight of at least 1500. Molded elastomeric products prepared from these latices are extremely solvent resistant and retain their physical properties at high and low temperatures and on aging. Moreover, fabrics coated or impregnated with these latices display outstanding resistance to solvents and no significant change in physical properties upon exposure to high and low temperatures.

---

This invention relates to new polyurethane latices. More particularly, this invention relates to new polyurethane latices prepared by chain extending prepolymers prepared by the reaction of organic diisocyanates with certain polyalkylene ether polyols having a functionality greater than two.

Polyurethane latices are known in the art. Generally, they are prepared by chain extending the reaction product of an organic diisocyanate and an organic compound having two active hydrogen atoms. Among the organic compounds having two active hydrogen atoms which are employed by the art are polyalkylene ether glycols, poly-(alkylene ether-alkylene thioether) glycols, alkyd resins, polyesters and polyester amides. Generally, latices prepared from these compounds are either coagulated and molded into useful elastomeric products or they are used in the preparation of coated, bound or impregnated articles of manufacture. A special use for these latices is in the preparation of coated fabrics. There are, however, several drawbacks to the use of the known polyurethane latices. Elastomeric products and coated and impregnated fabrics prepared with the known latices are not very solvent resistant. This seriously curtails the use of known polyurethane latices in many applications where solvent resistance is a factor. Moreover, at high and low temperatures and on aging, elastomeric products and coated and impregnated fabrics prepared with known polyurethane latices undergo a serious deterioration in their physical properties. This likewise curtails the use of known polyurethane latices in many applications where temperature is a factor. Thus, it can been seen that in many applications such as in the preparation of gaskets, tubing and other molded articles and in the preparation of coated fabrics which are useful in varying temperature media such as rubber gloves and other protective clothing, the known polyurethane latices are not suitable.

In accordance with this invention, new polyurethane latices are prepared by chain extending prepolymers prepared by the reaction of organic diisocyanates and certain polyalkylene ether polyols having a functionality greater than two. The essential finding of this invention is that when certain polyols, defined hereinafter, are employed in the preparation of polyurethane latices, the resulting latices offer advantages heretofore unassociated with polyurethane latices. Molded elastomeric products prepared from the latices of this invention are extremely solvent resistant and retain their physical properties at high and low temperatures and on aging. Moreover, fabrics coated or impregnated with the polyurethane latices of this invention display outstanding resistance to solvents and no significant change in physical properties upon exposure to high and low temperatures.

The polyalkylene ether polyols which are employed in the preparation of the polyurethane latices of this invention are those compounds which result from the reaction of an alkylene oxide and a compound having at least three active hydrogen atoms. Furthermore, the polyols must have a molecular weight of at least 1500. Alkylene oxides which may be employed in the preparation of the polyalkylene ether polyols are those oxides which have at least three carbon atoms such as propylene oxide, butylene oxide, styrene oxide, epichlorohydrin, tetrahydrofuran and cyclohexene oxide. Mixtures of any of the above may also be used. In addition, the above oxides may be used in combination with ethylene oxide. The amount of ethylene oxide in the mixture may vary considerably, depending upon the particular higher alkylene oxide used in conjunction therewith. In no instance, however, will the amount of ethylene oxide be greater than 50 percent by weight, based on the total weight of the alkylene oxide mixture.

Compounds having at least three active hydrogen atoms which may be employed in the preparation of the polyalkylene ether polyols include aliphatic alcohols such as glycerol, trimethylolpropane, pentaerythritol, sorbitol and sucrose; organic acids such as aconitic, trimellitic and hemimellitic; inorganic acid such as the phosphoric acids; amines such as ethylene diamines, propylene diamine, diethylene triamine and triisopropanolamine; phenolic compounds such as pyrogallol, dihydroxybenzoic acid, hydroxyphthalic acids and inositol mercaptans such as 1,2,3-propane trithiol and amides such as benzene disulfonamide. Mixtures of any of the above compounds may also be employed. The particular compound which is employed is not critical since it constitutes only a small proportion of the weight of the polyol. All that is important is that the compound have at least three active hydrogen atoms.

The polyalkylene ether polyols are prepared by standard art procedures such as catalytic polymerization of the oxide and the compound having at least three active hydrogen atoms. An alkaline catalyst such as potassium hydroxide is often employed in this polymerization.

The polyalkylene ether polyols which are employed in this invention must have a molecular weight of at least 1500. Molecular weights of from about 6000 to about 30,000 are preferred. We have determined, as demonstrated in the examples, that polyalkylene ether polyols having a molecular weight less than 1500 do not lend themselves to the preparation of latices having the advantages associated with those latices prepared from polyols of higher molecular weight.

If it is desired to improve the tensile and tear strength of the polymers prepared from the latices of this invention, diols may be employed along with the polyols in the prepartion of the latices. Any of the diols which are known in the art are suitable for this purpose, especially polyalkylene ether diols.

Organic diisocyanates which may be employed in the preparation of the polyurethane latices of this invention include aromatic, aliphatic, and cyloaliphatic diisocyanates and combinations thereof. Representative compounds include aromatic diisocyanates, such as 2,4-tolylene diisocyanate, mixtures thereof with 2,6-tolylene diisocyanate (usually about 80/20), 4,4'-methylene-bis(phenylisocyanate), and m-phenylene diisocyanate. Aliphatic compounds such as tetramethylene diisocyanate and hexamethylene diisocyanate, and alicyclic compounds such as 1,4-cyclohexylene diisocyanates and 4,4'-methylene-bis-(cyclohexylisocyanate) are also operable. Compounds such as 2,4-tolylene diisocyanate in which two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Additional diisocyanates which may be employed, for example, include 3,3'-dimethyl-4,4'-biphenylene diisocyanate,
3,3'-dimethoxy-4,4'-biphenylene diisocyanate,
4,4'-biphenylene diisocyanate,
4-dichloro-1,3-phenylene diisocyanate,
3,3'-dichloro-4,4'-biphenylene diisocyanate, and
1,5-naphathalene diisocyanate, and other diisocyanates in a blocked or semi-inactive form such as the bis-phenylcarbamates or tolylene diisocyanate, p,p'-diphenylmethane diisocyanate, p-phenylene diisocyanate, 1,5-naphthalene diisocyanate and 1,5-tetrahydronaphthalene diisocyanate.

As mentioned before, the latices of this invention are prepared by chain extending prepolymers prepared by the reaction of organic diisocyanates and certain polyalkylene ether polyols. The prepolymer is ordinarily prepared by heating a polyol and a diisocyanate with agitation at a temperature of from about 60° C. to about 110° C., preferably from about 70° C. to about 90° C. A catalyst may be employed in this reaction if desired. If a catalyst is employed, temperatures from about 0° C. to about 60° C. are satisfactory. The reactants are heated for a period sufficient to react all the hydroxyl groups, whereafter the prepolymer is allowed to stand and the free NCO content determined. Generally, total reaction time will be from about two hours to about four hours. However, if a catalyst is employed, a period of from about fifteen minutes to about one hour is sufficient.

The reaction is preferably carried out, but not necessarily, in the presence of a solvent. If the prepolymer is a fluid at processing temperatures, it is possible to carry out the reaction in the absence of a solvent. This is particularly so when polyols of molecular weight greater than 6000 are employed. Convenient solvents are organic solvents having a boiling range above 90° C. when the reaction is to be carried out in open equipment. Lower boiling solvents may, of course, be used where the reaction is carried out in closed equipment to prevent boiling off the solvent at the temperatures of the reaction. The solvent, when used, may be added at the beginning, at an intermediate point, or at the end of the prepolymer stage, or after cooling of the formed prepolymer. The solvents to be used are preferably those in which the reactants are soluble. Ketones and esters may be used. The aliphatic hydrocarbon solvents such as the heptanes, octanes and nonanes, or mixtures of such hydrocarbons obtained from naturally occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Hydrocarbon solvents such as toluene and benzene are preferred. The amount of solvent used may be varied widely. From 25 parts to 400 parts of solvent per 100 parts of polyol have been found to be operable. The excess solvent, where large amounts are employed, may be separated partially or completely from the polymer prior to emulsification in the water solution; sometimes the excess solvent is useful and is allowed to remain during the emulsification stage.

The amounts of organic diisocyanate and polyalkylene ether polyol which are employed in the preparation of the prepolymers are such that the NCO/OH equivalent ratio is between 1.5:1 to 3:1, preferably 2:1. At ratios greater than 3:1, incompatible resins tend to form, while at ratios less than 1.5:1 gelling of the polymer tends to occur.

After the prepolymer is prepared, it is emulsified by combining it with an aqueous solution of a surfactant with vigorous agitation. Emulsification of the prepolymer may occur by adding an aqous solution of a surfactant to the prepolymer, by adding the prepolymer to an aqueous solution of a surfactant, by initially adding a surfactant to the prepolymer reactants and then adding water after the prepolymer has been prepared or by adding a surfactant to an aqueous medium containing the prepolymer.

The amount of water to be employed in the formation of the emulsion is not critical. When too small an amount of water is employed, emulsions are obtained which are too thick to handle readily while, on the other hand, dispersions which are too dilute are uneconomical to handle due to their excessive volume.

Any emulsifying agent which will give oil-in-water emulsions is satisfactory for use in the present invention. Satisfactory types of emulsifying agents are the polyethylene glycol ethers of long chain alcohols, quaternary ammonium salts, the tertiary amine or alkylol amine salts of long chain alkyl acid sulphate esters, alkyl sulphonic acids or alkyl aryl sulphonic acids or salts thereof; and alkali metal salts of high molecular weight organic acids. Nonionic agents such as polyoxyethylene-polyoxyproplene glycols, are preferred. The pH can then be regulated to a neutral value, preferably not above seven, to minimize any tendency toward hydrolysis. Salts of the high molecular weight organic acids may be used as emulsifying agents. One method of incorporating such salts is to mix the acid, e.g. coconut oil, with the prepolymer mass and to have the requisite amount of alkali present in the aqueous bath, so as to form the emulsifier in situ. Although there is presumably some reaction between the acid and the free isocyanate groups in the prepolymer, this is not significant if the mixture is fairly promptly added to the aqueous bath. From 0.5 percent to six percent of the emulsifying agent, based on the weight of the prepolymer employed, will usually be found sufficient to produce stable emulsions. When a fatty acid soap is used as the emulsifying agent, the soap must not be destroyed by acidic substances. The pH must, therefore, be maintained at least as high as that of an aqueous solution of the soap if stable latices are to be produced. For most fatty acid soaps, the pH should be at least nine, and for this reason soaps are not preferred. The small amount of carbon dioxide which may be formed by the chain extension of the isocyanate groups with water is acidic and uses up free alkali in the latex, so that an excess of alkali may be necessary to compensate for this. Preferably no alkali is added to the reaction, since some usually remains and causes deterioration of the polymer at elevated temperatures.

Chain extension of the prepolymers occurs by adding a chain extending agent to the emulsified prepolymer. The chain extending agent is preferably added in the form of an aqueous solution or dispersion thereof. However, it may be added alone or in the form of a solvent solution thereof.

The chain extending agents which may be employed in the preparation of the latices of this invention are those compounds having at least two functional groups bearing active hydrogen such as water, hydrazine, primary and secondary diamines, amino alcohols, amino acids, hydroxy acids, glycols, or mixtures theerof. A preferred group of chain extending agents includes water and primary and secondary diamines which react more readily with the prepolymer than does water such as phenylene diamine, 1,4-cyclohexane-bis-(methylamine), ethylene diamine, diethylene triamine, N-(2-hydroxyropyl)ethylene diamine, N-N'-di(2-hydroxypropyl)-ethylene diamine, piperazine, 2-methylpiperazine, and dodecahydro-1,4,7,9b-tetraazaphenylene.

The amount of chain extending agent which is employed in the preparation of the latices of this invention is preferably about 1.0 equivalent of chain extending agent for each isocyanate equivalent. Up to about 1.3 equivalents may be employed. The chain extension step may frequently be assisted by agitation of the emulsion for some time after its initial formation. This is usually accomplished by means of a conventional paddle-type agitator at 30 r.p.m. to 90 r.p.m. or other conventional stirring equipment such as a Cowles Dissolver which aids in contacting the emulsion droplets with the chain extender.

The following examples serve to illustrate the invention. All parts are by weight unless otherwise specified.

Examples I–XII

Several polyurethane latices were prepared by the general procedure stated below. The details of each preparation are given in Table 1.

A. Prepolymer preparation.—A polyalkylene ether polyol was charged to a reaction vessel equipped with a thermometer, stirrer and heat exchange means. Toluene and an organic diisocyanate were then added and the charge was stirred for about three hours at 80° C. to 90° C. After cooling the reaction product (prepolymer), the NCO content was determined. Additional toluene was then added to the reaction vessel to assist in the chain extension step which followed.

B. Chain extension.—A surfactant dissolved in water was added to the cooled prepolymer solution. The aqueous surfactant solution was cooled prior to its addition to the prepolymer solution. The addition occurred with good agitation in a "dispersator" mixer. The emulsion which formed was passed through a homogenizer and a chain extending agent dissolved in cold water was added to the emulsion, forming a stable latex.

All of the latices detailed in Table 1 were prepared using a dihydric polyoxyethylenepolyoxypropylene having a molecular weight of about 16,000, a polyoxyethylene content of about 80 percent by weight and a molecular weight of the polyoxypropylene base of about 3250 as surfactant.

TABLE 1 [1]

| Example | Polyalkylene Ether Polyol | Mol Wt. | Chain Extender |
|---|---|---|---|
| I | Propylene oxide adduct of trimethylolpropane. | 747 | 2-methylpiperazine. |
| II | do | 1,575 | Water. |
| III | Propylene oxide adduct of glycerol. | 2,900 | 2-methylpiperazine. |
| IV | do | 2,953 | 2-hydroxypropylethylene diamine. |
| V | do | 2,900 | Water. |
| VI | Propylene oxide adduct of trimethylolpropane. | 4,176 | 2-methylpiperazine. |
| VII | Propylene oxide adduct of pentaerythritol. | 5,580 | Do. |
| VIII | Propylene oxide adduct of trimethylolpropane. | 6,120 | Do. |
| IX | do | 6,120 | 1,4-cyclohexane-bis (methylamine). |
| X | do | 6,120 | Water. |
| XI | Butylene oxide adduct of trimethylolpropane. | 6,100 | 2-methylpiperazine. |
| XII | Ethylene oxide-butylene oxide adduct of trimethylolpropane. | 14,100 | Do. |

[1] All latices were prepared using tolylene diisocyanate and an NCO/OH ratio of 2:1.

All of the latices prepared in the previous examples were coagulated either by freezing and adding an alcohol or simply by adding an alcohol. In each case, the coagulum was washed three times with water to remove the surfactant. The washed coagulum was dried overnight in an air circulated oven at 60° C. The dried coagulum was then pressed out in a single cavity mold for ten minutes at 6000 p.s.i. The resulting products were then tested and the results of these tests appear in Tables 2 and 3.

TABLE 2.—PHYSICAL PROPERTIES OF MOLDED PRODUCTS

| Product from Example | Modulus 100% | Elongation, Percent | Weight Percent Absorption | | |
|---|---|---|---|---|---|
| | | | Toluene | Methyl Pyrrolidone | Perchloroethylene |
| I | | 10 | 39 | 102 | 9 |
| II | 480 | 160 | 121 | 335 | 152 |
| III | 325 | 250 | 190 | 340 | 275 |
| IV | 206 | 170 | 188 | 306 | 280 |
| V | 214 | 260 | 229 | 400 | 304 |
| VI | 225 | 350 | 265 | 402 | 378 |
| VII | 448 | 230 | 283 | 420 | 407 |
| VIII | 119 | 460 | 417 | 466 | 592 |
| IX | 130 | 440 | 413 | 443 | 579 |
| X | 45 | 530 | 443 | 918 | 661 |
| XI | 149 | 610 | 471 | 435 | 688 |
| XII | 61 | 950 | 750 | 954 | 1,311 |

TABLE 3.—EFFECT OF TEMPERATURE ON 100% MODULUS

| Product from Example | 100% Modulus | | | | |
|---|---|---|---|---|---|
| | 50° C. | 25° C. | 0° C. | −25° C. | −50° C. |
| I | [1] | [1] | [1] | [1] | [1] |
| II | 412 | 482 | 558 | 4,404 | [1] |
| III | 321 | 325 | 368 | 739 | 1,960 |
| IV | 213 | 206 | 207 | 451 | 1,871 |
| V | 222 | 214 | 241 | 362 | 1,836 |
| VIII | 129 | 119 | 153 | 229 | 322 |
| IX | 124 | 130 | 168 | 258 | 302 |
| X | 58 | 45 | 59 | | 190 |
| XI | 91 | 149 | 193 | 375 | 463 |
| XII | 58 | 61 | 53 | 58 | 84 |

[1] Elongation less than 100%.

Examples XIII and XIV

In these examples a comparison is made of products based on polyalkylene ether polyols within the scope of this invention and on polypropylene ether glycols. Latices were prepared as set forth in Example I using 2-methylpiperazine as the chain extender, an NCO/OH ratio of 2:1 and tolylene diisocyanate. Polyethers of identical equivalent weight were employed in order to obtain a reasonable basis for comparison. Results of the test conducted on the products appear in Table 4.

TABLE 4

| | Example XIII | | Example XIV | |
|---|---|---|---|---|
| Polyether | A | B | C | D |
| Tensile Strength, p.s.i. | 2,261 | 3,994 | 768 | 1,099 |
| Modulus, 100% | 970 | 359 | 325 | 168 |
| Elongation, percent | 230 | 980 | 250 | 1,330 |
| Oven-Aged 140 hrs. at 135° C.: | | | | |
| Tensile Strength, p.s.i. | 2,116 | 624 | 569 | 58 |
| Modulus, 100% | 1,416 | 624 | 332 | |
| Elongation, percent | 169 | 100 | 170 | 50 |
| Surface Tack | [1] | [2] | [1] | [2] |
| Solvent Absorption (Wt. percent), 70 hrs. at 25° C.: | | | | |
| Toluene | 96 | 179 | 190 | 545 |
| Methyl Pyrrolidone | 291 | [3] | 340 | [3] |

[1] None. [2] Very tacky. [3] Dissolved.
A—1,575 molecular weight adduct of propylene oxide and trimethylolpropane.
B—1,050 molecular weight adduct of propylene oxide and propylene glycol.
C—3,030 molecular weight adduct of propylene oxide and glycerol.
D—2,010 molecular weight adduct of propylene oxide and propylene glycol.

Example XV

Two polyurethane latices were prepared following the procedure of Example I. In both preparations, 2-methylpiperazine, an NCO/OH ratio of 2:1 and tolylene diisocyanate were employed. In one preparation, a 2900 molecular weight polypropylene ether triol was employed and in the other a 1050 molecular weight polypropylene ether glycol. These compounds were selected since latices prepared therefrom have substantially similar 100 percent modulus values and toluene absorption. This is significant since these values, especially the modulus values, are often determinative of the latex which will be employed in a particular application. As the results in Table 5 indicate, only the polymer based on the triol retained its properties at high temperatures and on aging, was not tacky and was insoluble in methyl pyrrolidone, a standard polar solvent. These results demonstrate the superiority of the latex based on the triol.

TABLE 5

| Polyether | Triol | Diol |
|---|---|---|
| Mol. Wt. | 2,900 | 1,050 |
| Tensile Strength, p.s.i. | 768 | 3,994 |
| Modulus, 100% | 325 | 359 |
| Elongation, percent | 250 | 980 |
| Oven-Aged 140 Hrs. at 135° C.: | | |
|   Tensile Strength, p.s.i. | 569 | 624 |
|   Modulus, 100% | 332 | 624 |
|   Elongation, percent | 170 | 100 |
|   Surface Tack | (¹) | (²) |
| Solvent Absorption (Wt. percent), 70 Hrs. at 25° C.: | | |
|   Toluene | 190 | 179 |
|   Methyl Pyrrolidone | 340 | (³) |
| Effect of Temperature on 100% Modulus: | | |
|   50° C. | 321 | 199 |
|   25° C. | 325 | 359 |
|   0° C. | 368 | 858 |
|   −25° C. | 739 | 4,217 |
|   −50° C. | 1,960 | 7,209 |

¹ None.  ² Very tacky.  ³ Dissolved.

Example XVI

This example demonstrates the utility of the latices of this invention as fabric coatings. A latex was prepared as in Example VII. Nylon was coated with the latex following a standard air knife coating technique. The polyurethane-coated nylon fabric had a smooth, untacky finish. The coated nylon fabric retained both its finish and its physical properties upon subjection to both high and low temperatures.

This example was also carried out using Dacron and cotton in lieu of nylon. Comparable results were obtained.

A latex was prepared following the procedure of Example VII with the single exception that a polyol having a functionality of two was used. The polyol was a 3000 molecular weight polypropylene ether glycol. Nylon was coated with this latex as above. The coated nylon fabric had a sticky finish and, upon subjection to variant temperatures, a considerable change in the physical properties of the coated fabric was noticed, i.e., at high temperatures the fabric became very sticky and difficult to handle while at low temperatures the coated fabric became rather brittle.

The use of both of the latices of this example to coat cotton gloves clearly demonstrated the superiority of the latex of this invention.

The latices of this invention are useful in many applications. Among the many articles and uses to which these latices are applicable may be mentioned the following: fabric coatings for rainwear, tarpaulins and baby pants; fabric and textile filament impregnants to improve abrasion resistance and wrinkle resistance; paper coatings and impregnants for improved durability, grease resistance, gloss and wet and tear strength; binders for nonwoven fabrics; industrial adhesives; production of urethane films and fibers, leather coating and impregnants for improved abrasion resistance and water resistance; and industrial coatings for metal, wood and concrete.

We claim:

1. A polyurethane latex prepared by the chain extension of a prepolymer prepared by the reaction in an NCO/OH equivalent ratio of from 1.5:1 to 3:1 of an organic diisocyanate with a polyalkylene ether polyol having a functionality greater than two and a molecular weight of at least 1500, said polyol prepared from an alkylene oxide having at least three carbon atoms or a mixture of alkylene oxides containing at least 50% by weight of an alkylene oxide having at least three carbon atoms.

2. The polyurethane latex of claim 1 when the molecular weight of the polyalkylene ether polyol is from about 6000 to about 30,000.

3. The polyurethane latex of claim 1 when the prepolymer is chain extended with a secondary diamine.

4. The polyurethane latex of claim 1 when the prepolymer is chain extended with 2-methylpiperazine.

5. The polyurethane latex of claim 1 when the prepolymer is chain extended with piperazine.

6. The polyurethane latex of claim 1 when the prepolymer is chain extended with water.

7. The polyurethane latex of claim 1 when the organic diisocyanate is tolylene diisocyanate.

8. The polyurethane latex of claim 1 when the polyalkylene ether polyol is the reaction product of propylene oxide and a trihydric alcohol.

9. The polyurethane latex of claim 1 when the polyalkylene ether polyol is the reaction product of propylene oxide and trimethylolpropane.

10. The polyurethane latex of claim 1 when the polyalkylene ether polyol is the reaction product of propylene oxide and glycerol.

11. The polyurethane latex of claim 1 when the polyalkylene ether polyol is the reaction product of propylene oxide and pentaerythritol.

12. The polyurethane latex of claim 8 when the molecular weight of the polyalkylene ether polyol is from about 6000 to about 30,000.

13. The polyurethane latex of claim 1 when the polyalkylene ether polyol is the reaction product of a mixture of ethylene oxide and butylene oxide and a trihydric alcohol.

14. The polyurethane latex of claim 13 when the molecular weight of the polyalkylene ether polyol is from about 6000 to about 30,000.

15. The polyurethane latex of claim 1 when the organic diisocyanate and the polyalkylene ether polyol are employed in an NCO/OH equivalent ratio of 2:1.

16. Molded products prepared from a latex of claim 1.

17. Fabrics coated with a latex of claim 1.

18. A process for the preparation of a polyurethane latex which comprises contacting at a temperature of from about 0° C. to about 110° C. an organic diisocyanate with a polyalkylene ether polyol having a functionality greater than two and a molecular weight of at least 1500 in an NCO/OH ratio of 2:1, said polyol prepared from an alkylene oxide having at least three carbon atoms or a mixture of alkylene oxides containing at least 50% by weight of an alkylene oxide having at least three carbon atoms, thereafter emulsifying the reaction product of the diisocyanate and the polyol in water and chain extending the emulsified reaction product with an agent having at least two functional groups bearing active hydrogen.

19. The process of claim 18 wherein the molecular weight of the polyalkylene ether polyol is from about 6000 to about 30,000.

References Cited

UNITED STATES PATENTS

| | | | |
|---|---|---|---|
| 2,968,575 | 1/1961 | Mallonee | 260—29.2 |
| 3,061,497 | 10/1962 | Wilson et al. | 260—77.5 |
| 3,169,934 | 2/1965 | Dennett et al. | 260—77.5 |
| 3,178,310 | 4/1965 | Berger et al. | 260—29.2 |
| 3,213,049 | 10/1965 | Heiss | 260—29.2 |
| 3,222,300 | 12/1965 | Loew. | |
| 3,294,724 | 12/1966 | Axelrood | 260—29.2 |

MURRAY TILLMAN, *Primary Examiner.*

J. C. BLEUTGE, *Assistant Examiner.*